United States Patent
Tamir et al.

(10) Patent No.: US 9,703,742 B2
(45) Date of Patent: Jul. 11, 2017

(54) UNIFIED DEVICE INTERFACE FOR A MULTI-BUS SYSTEM

(71) Applicant: Intel Corporation, Santa Clara, CA (US)

(72) Inventors: Eliezer Tamir, Bait Shemesh (IL); Eliel Louzoun, Jerusalem (IL)

(73) Assignee: INTEL CORPORATION, Santa Clara, CA (US)

(*) Notice: Subject to any disclaimer, the term of this patent is extended or adjusted under 35 U.S.C. 154(b) by 343 days.

(21) Appl. No.: 14/498,165

(22) Filed: Sep. 26, 2014

(65) Prior Publication Data

US 2016/0092389 A1    Mar. 31, 2016

(51) Int. Cl.
| | |
|---|---|
| G06F 3/00 | (2006.01) |
| G06F 13/36 | (2006.01) |
| G06F 13/40 | (2006.01) |
| G06F 9/50 | (2006.01) |
| G06F 13/24 | (2006.01) |

(52) U.S. Cl.
CPC ........ *G06F 13/4072* (2013.01); *G06F 9/5083* (2013.01); *G06F 13/24* (2013.01); *G06F 13/4022* (2013.01)

(58) Field of Classification Search
None
See application file for complete search history.

(56) References Cited

U.S. PATENT DOCUMENTS

| | | | |
|---|---|---|---|
| 7,386,619 B1 * | 6/2008 | Jacobson | G06F 15/163 709/201 |
| 2005/0102682 A1 | 5/2005 | Shah et al. | |
| 2008/0270599 A1 | 10/2008 | Tamir et al. | |
| 2012/0173860 A1 | 7/2012 | Li et al. | |
| 2014/0059266 A1 | 2/2014 | Ben-Michael et al. | |

FOREIGN PATENT DOCUMENTS

EP    1684173 A1    7/2006

OTHER PUBLICATIONS

International Search Report and Written Opinion received for PCT Application No. PCT/US2015/047752, mailed on Dec. 8, 2015, 11 pages.
International Preliminary Report on Patentability and Written Opinion issued in PCT Application No. PCT/US2015/047752, dated Apr. 6, 2017, 8 pages.

* cited by examiner

*Primary Examiner* — Idriss N Alrobaye
*Assistant Examiner* — Richard B Franklin
(74) *Attorney, Agent, or Firm* — Grossman, Tucker, Perreault & Pfleger, PLLC

(57) ABSTRACT

The present disclosure is directed to a unified device interface for a multi-bus system. In at least one embodiment, a system may comprise more than one data bus. Each data bus may be to convey data between an operating system (OS) and at least one device in the system, wherein a plurality of driver instances may facilitate interaction between the OS and a device via one or more of the data buses. In one embodiment, a main driver instance may be determined from the plurality of driver instances to present the device to the OS and coordinate operation of other driver instances. The other driver instances may map addresses in the memory of processing entities corresponding to each of the data buses and report these mappings to the main driver instance. Alternatively, a supervisory driver may be loaded to present the device and to control operation of the driver instances.

19 Claims, 5 Drawing Sheets

UNIFIED DEVICE INTERFACE FOR A MULTI-BUS SYSTEM

TECHNICAL FIELD

The present disclosure relates to a communication bus system, and more particularly, to a system for presenting a unified interface to access a device accessible by more than one data bus.

BACKGROUND

Computing devices comprising more than one resource for processing data are becoming more common. For example, emerging servers may comprise a plurality of separate processing entities that may each include at least one central processing unit (CPU) and localized memory, and each processing entity may be coupled to a separate communication bus. Processing entities may be able to access resources in other processing entities (e.g., remote resources), and thus, the overall system architecture may be reconfigurable to accommodate a variety of processing tasks, processing loads, etc. While the intention may be for processing entities to function equally as efficiently when accessing local or remote resources, at least one challenge that may exist is to minimize interaction that must occur between different processing entities. When processing entities are required to access resources in other processing entities, a performance penalty is incurred that may negatively impact the overall performance of the system, and possibly of the entire data processing architecture.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
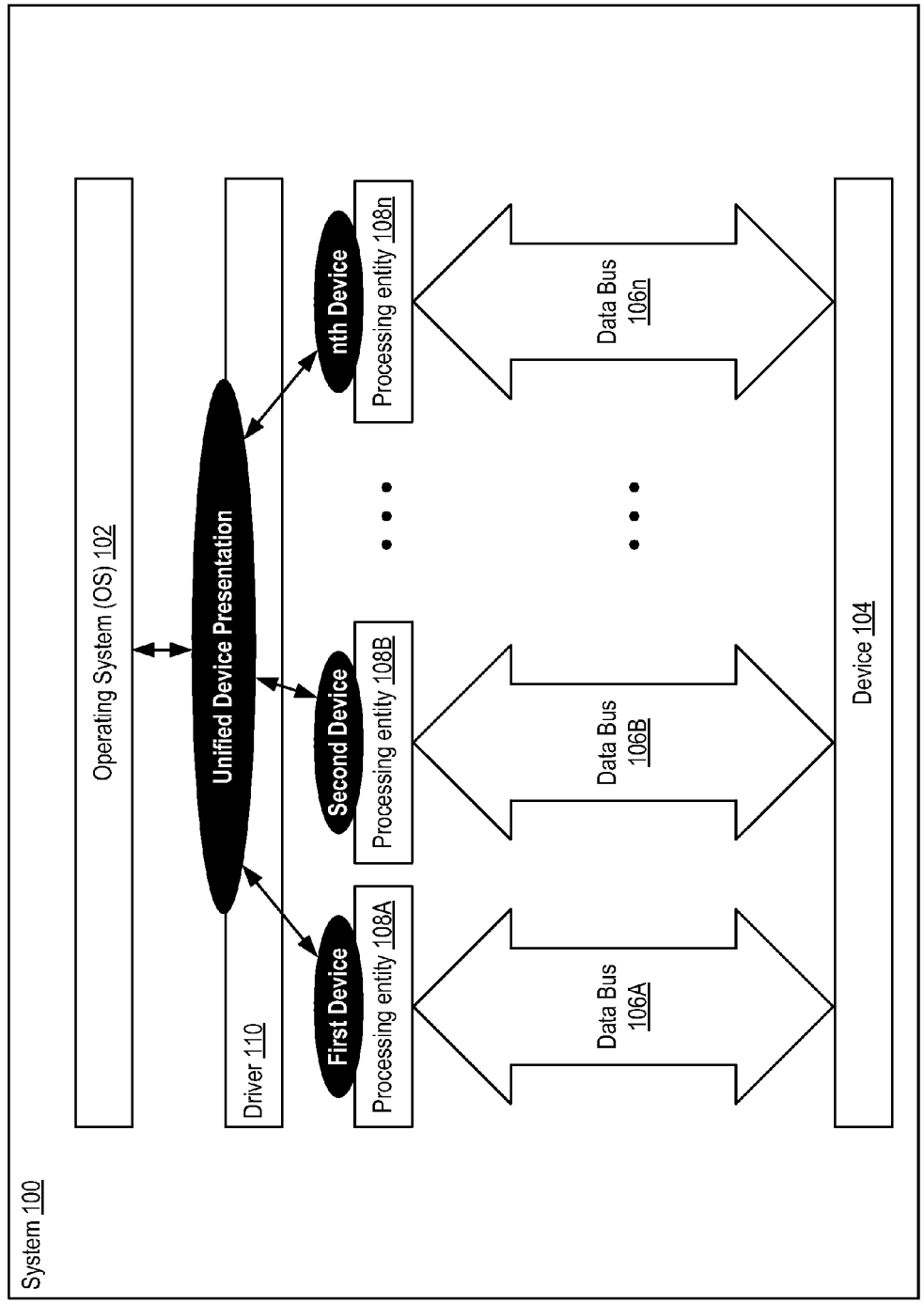
FIG. 1 illustrates an example of multi-bus system including a unified device interface in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to a unified device interface for a multi-bus system. In at least one embodiment, a system may comprise more than one data bus. Each data bus may be to convey data between an operating system (OS) and at least one device in the system. In some data bus technologies, a driver may facilitate interaction between the OS and a device via one or more of the data buses. Typically, the driver comprises different instances corresponding to each data bus, and would report the device as a different device for each bus. However, consistent with the present disclosure, the device may be presented to the OS as a single device. In at least one embodiment, a main driver instance may be determined from the plurality of driver instances to present the device to the OS and coordinate operation of other driver instances. For example, the other driver instances may map addresses in the memory of processing entities corresponding to each of the data buses, and may report these mappings to the main driver instance for use in controlling data routing between the OS and the device. Alternatively, a supervisory driver may be loaded to unify the presentation of the device and to control operation of the driver instances.

In at least one embodiment, a system to coordinate access to a device in the system may comprise, for example, a plurality of data buses, at least one device, an OS and at least one driver. The at least one device may be coupled to the plurality of data buses. The at least one driver may be to receive configuration data from the at least one device via the plurality of data buses and to coordinate interaction between the OS and the at least one device based at least on the configuration data.

In at least one embodiment, the plurality of data buses may each be coupled to a plurality of processing entities, each of the plurality of processing entities comprising at least one processor and memory coupled to the at least one processor. The at least one driver may comprise, for example, a plurality of driver instances, each of the plurality of driver instances being assigned to one of the plurality of processing entities to coordinate interaction between the plurality of processing entities and the operating system. The at least one driver being to coordinate interaction may comprise, for example, the at least one driver being to determine a main driver instance in the plurality of driver instances, the main driver instance being at least to register the at least one device with the operating system. The main driver instance may further be to receive address mappings from other driver instances in the plurality of driver instances and to assign at least one of queues or interrupts in each processing entity based on the mappings. The plurality of data buses may further be to convey data between the OS and the at least one device based on the at least one of queues or interrupts in each processing entity. The plurality of data buses being to control interaction between the OS and the at least one device may comprise the plurality of data buses being to track from which particular data bus in the plurality of data buses particular data was received, and to route data associated with the particular data back through the particular data bus. Alternatively, the plurality of data buses being to control interaction between the OS and the at least one device may comprise the plurality of data buses being to route data to a particular data bus in the plurality of data buses based on a table indicating memory locations associated with each of the plurality of data buses.

In at least one embodiment, each of the plurality of driver instances may be to establish at least one of queues or interrupts in each assigned processing entity. The system may then further comprise a supervisory driver to control the plurality of driver instances based on certain criteria. The certain criteria may comprise, for example, at least load balancing for the plurality of processing entities. An example method for coordinating access to a device in a system consistent with the present disclosure may comprise determining that at least one device needs to be registered with an operating system, the at least one device interacting with the OS via a plurality of data buses, loading at least one driver to receive configuration data from the at least one device via the plurality of data buses and coordinating interaction between the operating system and the at least one device based on the configuration data.

FIG. 1 illustrates an example of a multi-bus system including unified device recognition in accordance with at least one embodiment of the present disclosure. Initially, while terminology, concepts, structures, etc. that may be commonly associated with PCIe may be employed herein to explain various embodiments consistent with the present disclosure, PCIe is but one example of a data bus architecture that may be utilized to implement these various embodiments. It may also be possible to implement these various embodiments using other bus architectures such as, but not limited to, Intel QuickPath Interconnect (QPI), Intel On-Chip System Fabric (IOSF), HyperTransport (HT) or other bus architectures having similar operational characteristics to the examples mention above.

In general, system 100 may comprise at least one data processing apparatus. Examples of system 100 may comprise, but are not limited to, a mobile communication device such as a cellular handset, a smart phone, etc. based on the Android® OS from the Google Corporation, iOS® from the Apple Corporation, Windows® OS from the Microsoft Corporation, Mac OS from the Apple Corporation, Tizen™ OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, a Surface® from the Microsoft Corporation, Galaxy Tab® from the Samsung Corporation, a Kindle Fire® from the Amazon Corporation, etc., an Ultrabook® including a low-power chipset manufactured by Intel Corporation, netbooks, a notebook, a laptop, a palmtop, etc., a wearable devices such as wristwatch form factor computing devices like the Galaxy Gear® from Samsung, eyewear form factor interfaces like Google Glass® from the Google Corporation, etc., a typically stationary computing device such as a desktop computer, a server (e.g., multi socket servers), mainframes, a smart television, a small form factor computing solution (e.g., for space-limited computing applications, TV set-top boxes, etc.) like the Next Unit of Computing (NUC) platform from the Intel Corporation, etc. Groups comprising more than one of any of the above example devices may also be substituted for system 100. An example of a group of devices may be, for example, a rack scale processing architecture including a plurality of individual servers.

Consistent with the examples presented above, system 100 may comprise some common features such as processors, memory, a power supply, a user interface through which a user may interact with system 100, a communication module, etc. The presence/absence of each of these features in system 100 may depend upon an application for which system 100 was intended. For example, a mobile communication device, a portable computing device, etc. may comprise most or all of the above features to allow a user to interact with the device, the device to interact with other devices, etc., while a server may simply handle data, and thus may omit some features like a user interface (e.g., which may be provided by a remote host). System 100 may also be defined as a plurality of individual devices such as set forth in the above examples. For example, system 100 may include a group of servers that may operate individually or collaboratively to perform a task, wherein the resources of the grouped servers may be viewed collectively as "system 100."

System 100 may comprise OS 102 that may interact with at least one device 104. For the sake of explanation, device 104 could be a network interface card (NIC) plugged into a PCIe slot in system 100. In such an instance device 104 may be accessed by OS 102 to transmit data from, and receive data into, system 100 via a wired and/or wireless connection to a LAN, WAN, GAN, etc. To access these features, OS 102 may interact with device 104 via a data bus infrastructure including a plurality of data buses such as, for example, data bus 106A, data bus 106B . . . data bus 106n (collectively "data buses 106A . . . n"). Data buses 106A . . . n may be coupled to processing entity 108A, processing entity 108B . . . processing entity 108n (collectively "processing entities 108A . . . n), respectively. In one embodiment, processing entities 108A . . . n may comprise at least one processor and local memory associated with the at least one processor. Example processors may include various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of memory may comprise random access memory (RAM) and/or read-only memory (ROM) in a fixed or removable format. RAM may include volatile memory configured to hold information during the operation of system 100 such as, for example, static RAM (SRAM) or Dynamic RAM (DRAM). ROM may include non-volatile (NV) memory modules configured based on BIOS, UEFI, etc. to provide instructions when system 100' is activated, programmable memories such as electronic programmable ROMs (EPROMS), Flash, etc.

In at least one embodiment, it may be desirable for the at least one processor within each processing entity 108A . . . n to primarily access local memory as opposed to remote memory (e.g., a memory connected to another processing entity 108A . . . n). Accessing local memory is favored because the speed at which remote memory may be accessed may be much slower than the speed of accessing local memory. Moreover, more than one processor concurrently accessing the same memory may substantially reduce processing speed, and thus, the overall performance of system 100. Instances where processing entities 108A . . . n may attempt to access remote memory will be referred to herein as "crosstalk" between processing entities 108A . . . n.

At least one scenario that may increase crosstalk between processing entities 108A . . . n is when device 104 is coupled to OS 102 via a plurality of data buses 106A . . . n. Typically, at least one driver 110 will orchestrate the registration of device 104 with OS 102. For example, driver 110 may include different "instances" (e.g., specific occurrences of programmatic objects loaded into a memory) corresponding to each processing entity 108A . . . n. Each instance may configure device 104 and/or processing entity 108A . . . n to work together based on information provided by device 104. However, each instance may report different registration information for device 104. For example, in PCIe each instance may configure a different function for device 104 in each processing entity 108A including a different media access control (MAC) address, a different Internet Protocol (IP) address, etc. Each of the instances may then report their local registration information to the OS, which may cause the OS to set different device profiles (e.g., functions)

corresponding to the same device. The existence of different programmatic functions that all correspond to the same device may increase crosstalk because, for example, processing entity 108A may attempt to access device 104 utilizing address information provided by OS 102, but that address information may be the function registered in OS 102 by processing entity 108B. As a result, processing entity 108A will attempt to access device 104 through processing entity 108B/data bus 106B instead of simply making the most direct connection via data bus 106A.

To avoid this situation, a unified presentation of device 104 is preferable so that each processing entity 108A . . . n may utilize its own corresponding memory and data bus 106A . . . n to perform operations related to device 104. In at least one embodiment, regardless of the fact that a "first device" may be presented by a driver instance corresponding to processing entity 108A/data bus 106A, a "second" device may be presented by another driver instance corresponding to processing entity 108B/data bus 106B . . . a "nth" device may be presented by a driver instance corresponding to processing entity 108n/data bus 106n, some form of intervention may occur in driver 110 to present only one device (e.g., a "unified driver presentation") to OS 102. In this manner, operations originating from OS 102 may be able to be routed via any data bus 106A . . . n, or possibly via more than one data bus 106A . . . n to speed up execution. Moreover, processing entities 108A . . . n may operate within local memory and through their own corresponding data bus 106A . . . n, which may reduce crosstalk between processing entities and increase overall system performance. Two examples of how unified device presentation may be implemented in system 100 will be disclosed in reference to FIG. 2-5. The examples disclosed in FIG. 2-5 will employ PCIe terminology, concepts, structures, etc. merely for the sake of explanation herein.

Figure 2:
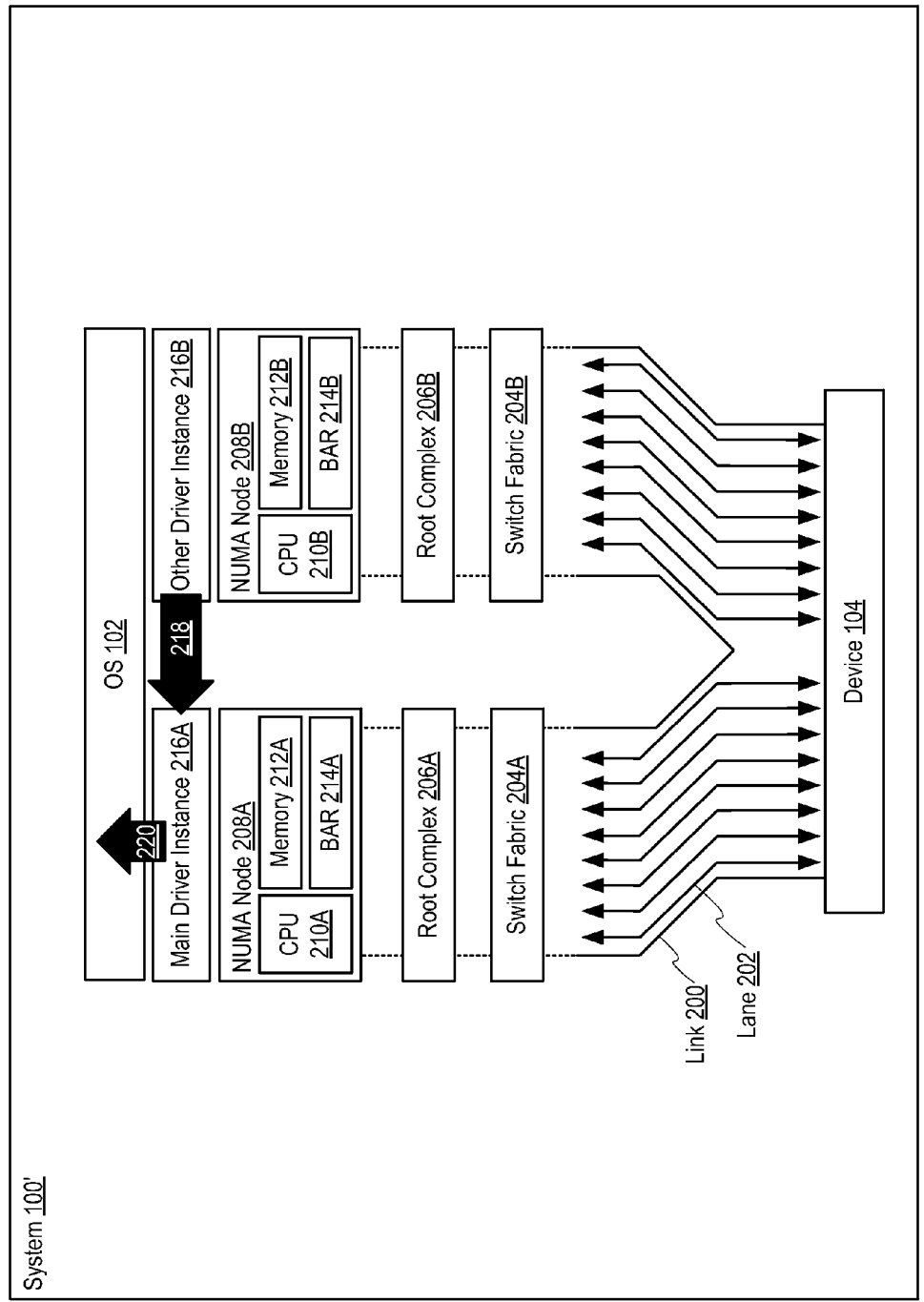
FIG. 2 illustrates an example peripheral component interconnect express (PCIe) system configured for unified device recognition utilizing a main driver in accordance with at least one embodiment of the present disclosure.

FIG. 2 illustrates an example PCIe system configured for unified device recognition utilizing a main driver in accordance with at least one embodiment of the present disclosure. In FIG. 2, OS 102 may be coupled to a device 104 in a manner similar to FIG. 1. However, FIG. 2 discloses a more practical example based on PCIe. In general, a PCIe bus may couple various devices (e.g., a NIC), to other resources in a system via a link made up of individual lanes. Typically, these lanes work collaboratively to convey data to and from the device, and thus, the more lanes that exist in a link the larger the communication bandwidth. However, some devices may now be able to subdivide or "split" their link so that at least some of these lanes may service different data sources. An example of how a PCIe link to a NIC may be split to allow the NIC to be shared is disclosed in U.S. published patent application 20140059266 A1 entitled, "Methods and apparatus for sharing a network interface controller" filed Aug. 24, 2012.

FIG. 2 discloses an example of lane splitting functionality. Link 200 may comprise a total of sixteen lanes 202, wherein eight lanes 202 may be directed to one data source and the remaining eight lanes 202 may be directed to another data source. While the example of system 100' shows link 200 being split in half, other subdivisions may be possible down to each individual lane 202 being directed to support a different data source. The ability to split link 200 may allow for new functionality such as, for example, device 104 being sharable with different systems 100' (e.g., sharable between different servers), the ability to support equal latency when accessing device 104 from multiple sockets (e.g., processing entities 108A . . . n), etc.

As shown in system 100', link 200 may be split so that eight lanes 202 are configured to support switch fabric 204A, while the remaining eight lanes 202 are configured to support switch fabric 204B. Switch fabrics 204A and 204B may comprise one or more switching devices for routing data, the switching devices being controlled by root complex 206A and root complex 206B, respectively. Root complexes 206A and 206B may comprise resources (e.g., PCIe ports and switching devices) for generating transaction requests on behalf of non-uniform memory access (NUMA) nodes 208A and 208B, respectively. NUMA nodes 208A and 208B may each comprise, for example, at least one central processing unit (CPU) 210A and 210B, respectively, local memories 212A and 212B, respectively and base address registers (BARs) 214A and 214B, respectively. For example, BARS 214A and 214B may point to regions within memories 212A and 212B, respectively, wherein PCIe addressing mapping data may be stored corresponding to device 104. NUMA nodes 208A and 208B may be designed to operate most efficiently when processing data locally. For example, NUMA node 208A may operate most efficiently when CPU 210A processes data stored in memory 212A and communicates with device 104 via root complex 206A and switch fabric 204A. CPU 210A having to access any B-side resources may result in a negative performance impact due to the possibility of concurrent memory accessing.

As described in regard to FIG. 1, driver 110 may comprise a plurality of driver instances, wherein at least one instance may correspond to each NUMA node 208A and 208B. Consistent with the present disclosure, the presentation of device 104 to OS 102 may be unified by electing one of the driver instances to coordinate communication operations for the other driver instances. Main driver instance 216A may be determined from the plurality of driver instances, and may be responsible for registering device 104 with OS 102 and facilitating the routing of data between OS 102 and device 104. Main driver instance 216A may be determined in a variety of manners. For example, there may be a different PCIe device ID for a driver instance that is associated with a main function as opposed to other driver instances that may be mirroring the main function. In another example implementation, the first driver instance to load may be main driver instance 216A. The determination of main driver instance 216A may also be left up to the hardware control (e.g., firmware) for data routing. For example, in systems 100' that comprise an admin queue, the first driver instance to initialize the firmware will receive a device capability table for device 104 and would be designated main driver 216A, while other driver instance 216B would then learn that it is mirroring main driver instance 216A. It may also be important to be able to determine which driver instances are associated with the same physical device functions. This may be achieved based on the MAC address associated with each driver instance. Alternatively, a special register may be employed if different device IDs are employed for "main" and "mirror" functions (e.g., driver instances associated with mirror functions may have registers that report the {bus; device;function} of the main function). If a certain implementation consistent with the present disclosure employs firmware, the firmware may report to all of the mirror functions the identity of the main function. The firmware may also report when a device has been initialized so that the mirror drivers may proceed with registering their own BARs with the "main" driver. Registration may comprise, for example, main driver instance 216A and other driver instance 216B writing to control registers in each of BAR 214A and 214B, respectively. However, only main driver instance 216A presents device 104 to OS 102 as shown at 220. The presentation may comprise, for example, the provision of data that allows OS 102 to configure device 104. Other driver instance 216B, may claim the PCIe functions for device 104 and create mappings in BAR 214B, but does not proceed to register device 104 with OS 102. Instead, other driver instance 216B may establish their own configuration (e.g., address mappings, buffers, etc.) and may then provide at least the address mappings to main driver instance 216A as shown at 218.

Main driver instance 216A may then proceed to coordinate operations for all of the driver instances. For example, main driver instance 216A may allocate a partial set of registers used in communicating with device 104 to be managed by other driver instance 216B (e.g., main driver instance 216A may own queues 1-10 while other driver instance 216B may own queues 11-20). In at least one embodiment, an enforcement mechanism may be used to enforce the assignments made by main driver instance 216A. For example, when each driver instance owns a different hardware interface (e.g., root complexes 206A and 206B associated with NUMA nodes 208A and 208B, respectively), in most cases the driver instances are "trusted" not to access parts of system 100' outside of their specific assignment. However, in some situations (e.g., such as when a virtual machine (VM) is granted access to hardware) it may be necessary to make sure that only specific control interfaces are accessible to a driver running inside the VM to prevent, for example, a malicious client running their own custom OS in an attempt to "fish" sensitive or confidential data from another VM running on the same physical system. Therefore in these situations, it may be prudent to implement an enforcement mechanism in system 100' that limits the registers that may be accessed by a driver instance through a secondary interface to only the control registers associated with the queues assigned to the driver instance. In this manner the data within system 100' may be protected from attacks from malicious software (e.g., malware).

There may also be a mechanism for directing transmissions between device 104 and OS 102 utilizing an appropriate (e.g., the most efficient) path. In at least one embodiment, the driver code may access device 104 through a BAR 214A or 214B that is attached to its local PCIe root complex. Steering hardware in device 104 may learn from the driver instance 216A or 216B that sent a packet from a given flow which root complex 206A or 206B should handle the flow when corresponding data is transmitted back to OS 102. For example, a determination may be made as to which root complex 206A or 206B to use based on learning from which CPU 210A or 210B a message originated. Alternatively, an address table may comprise ranges of addresses that belong to each root complex 206A and 206B. The address table may be generated, for example, during registration of device 104 with OS 102. The list of ranges may be short including, for example, one or two ranges per root complex 206A or 206B. In another example implementation, a per-queue configuration made determined as regarding which root complex 206A or 206B to utilize. While the particular routing solution utilized may depend upon the configuration of system 100', in any of the above solutions a hardware-based solution (e.g., a chip or chipset to control routing possibly including firmware) may be employed to make the data routing decisions. The control over routing may also extend to direct memory access (DMA) read and writes between the main function and other functions of device 104. Device 104 may comprise a DMA engine through which access to data may be coordinated. For example, the DMA engine may comprise a static table of addresses that correspond to each function, and through this static list of address data may be read from, or written to, the various functions that may be associated with device 104.

Figure 3:
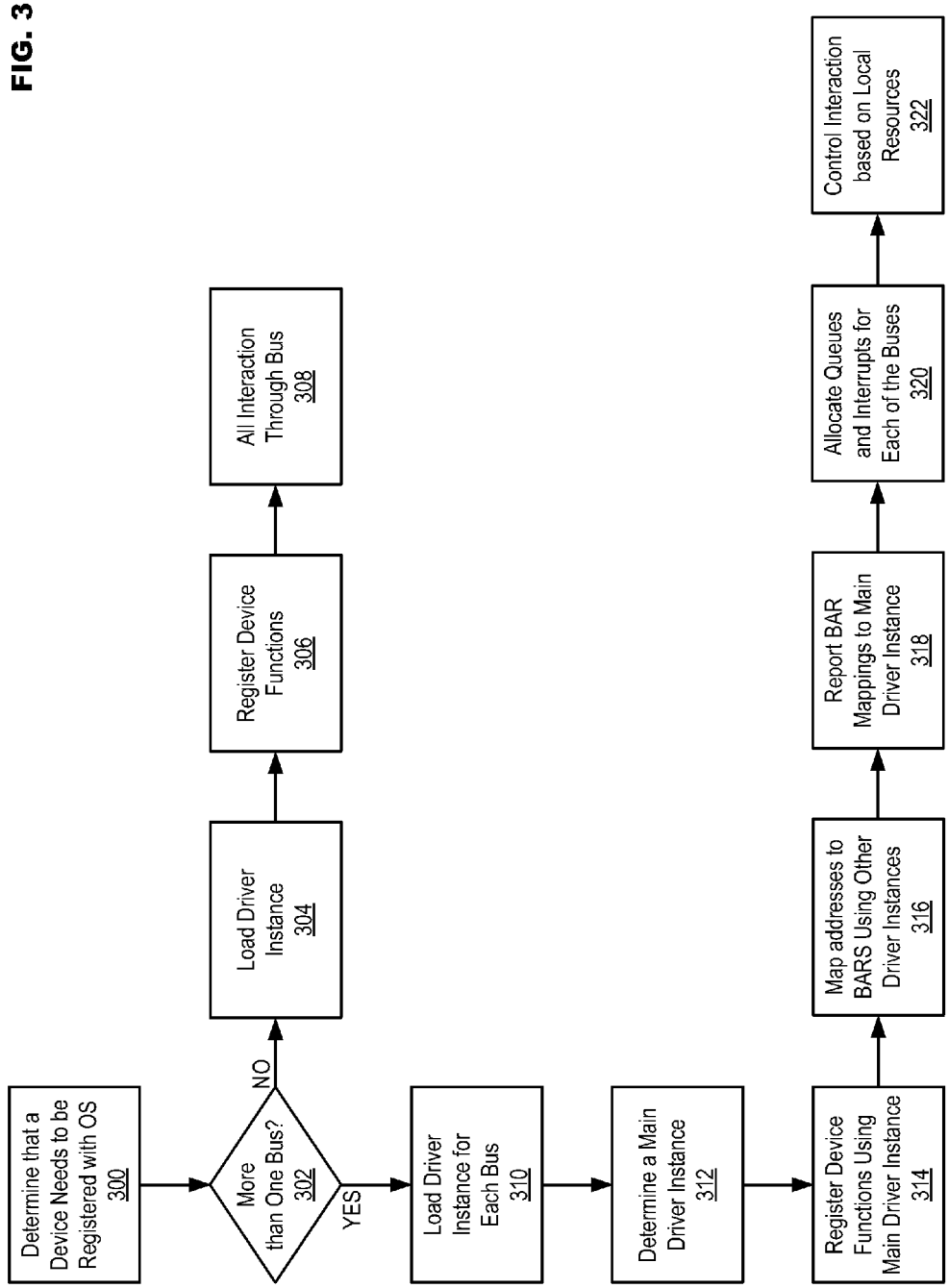
FIG. 3 illustrates example operations for unified device control using a main driver in accordance with at least one embodiment of the present disclosure.

FIG. 3 illustrates example operations for unified device recognition using a main driver in accordance with at least one embodiment of the present disclosure. In operation 300 it may be determined that device 104 needs to be registered with OS 102. The determination in operation 300 may be triggered by system 100 being reinitiated (e.g., due to system 100 being powered up, rebooted, etc.), device 104 being added to system 100', etc. A determination may then be made in operation 302 as to whether system 100' comprises more than one data bus. If it is determined in operation 302 that only one bus exists, then in operation 304 a driver instance may be loaded. The driver instance may register device functions with OS 102 in operation 306 and interaction between OS 102 and device 104 may take place through the data bus in operation 308.

If in operation 302 it is determined that more than one data bus exists in system 100', then in operation 310 a driver instance may be loaded corresponding to each data bus. A main driver instance 216A may then be determined from the loaded driver instances in operation 312, and main driver instance 216A may register the device functions with the OS in operation 314. In operation 316 the other driver instances 216B may map at least control register addresses to a BAR (e.g., 214A, 214B, etc.) corresponding to each data bus, and in operation 318 may report the BAR mappings to main driver instance 216A. Main driver instance 216A may then allocate queues, interrupts, etc. to each other driver instance 216B to manage in operation 320. In operation 322 main driver instance 216A may proceed to control interaction between OS 102 and device 104 based on local resources (e.g., BAR, root complex, etc.) associated with each data bus, and thus, the interaction may take place in an efficient manner (e.g., with little or no crosstalk between NUMA nodes).

Figure 4:
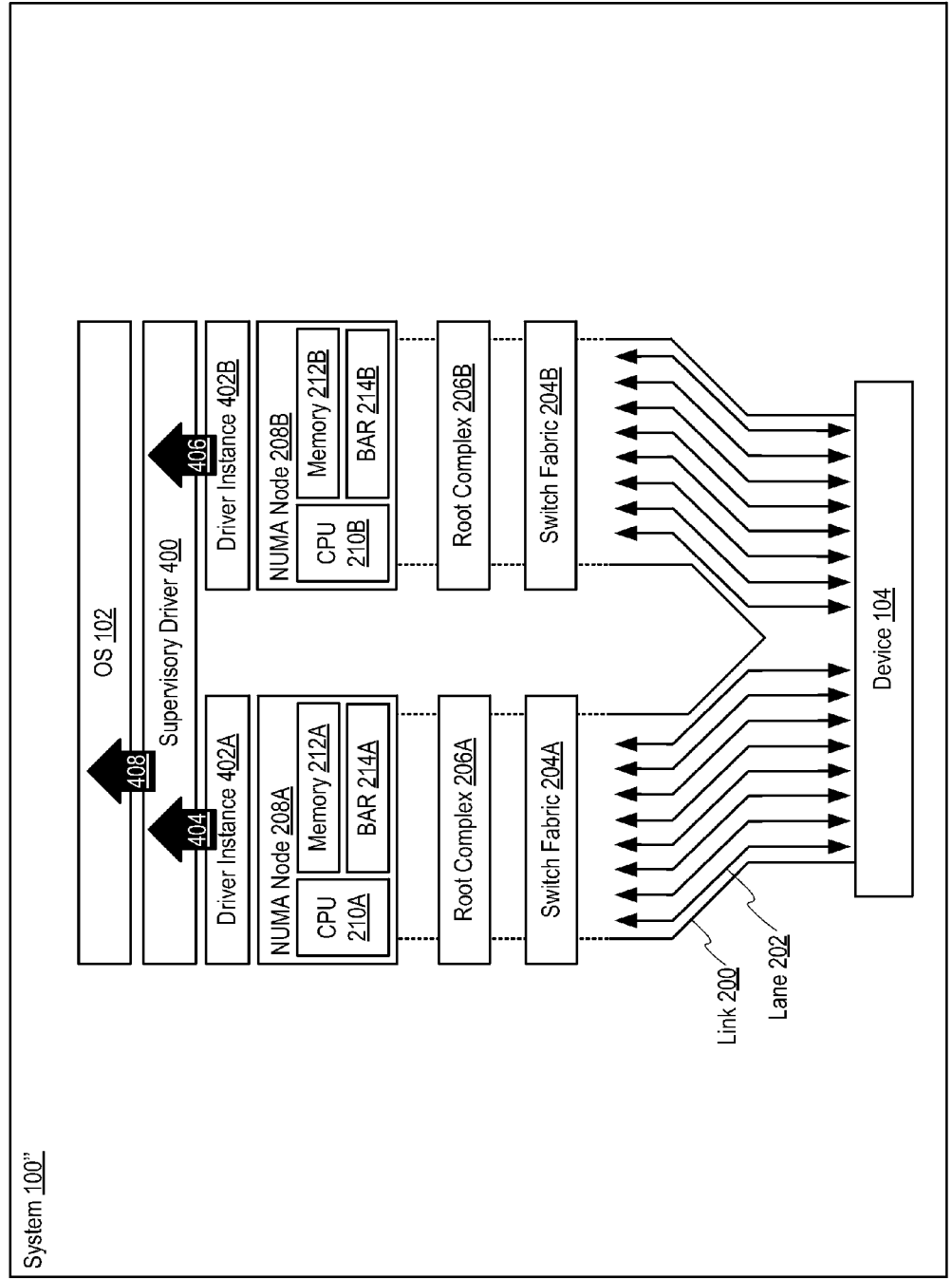
FIG. 4 illustrates an example PCIe system configured for unified device control using a supervisory driver in accordance with at least one embodiment of the present disclosure.

FIG. 4 illustrates an example PCIe system configured for unified device recognition using a supervisory driver in accordance with at least one embodiment of the present disclosure. Consistent with the present disclosure, it may also be possible to manage interaction between OS 102 and device 104 via supervisory or "teaming" driver 400. The discovery of functions that may correspond to the same physical device 104 may occur using the same methodologies as set forth in FIG. 2, and then these functions may be teamed together by supervisory driver 400. For example, each driver instance (e.g., driver instances 402A and 402B) may map addresses for at least the control register to each BAR 214A and 214B, allocate local buffers, queues interrupts, etc. Supervisory driver 400 may then be made aware of this data as shown at 404 and 406.

Supervisory driver 400 may then control the interaction between OS 102 and device 104 as shown at 408. For example, OS 102 may generate message traffic for device 104, which may be routed by supervisory driver 400 to at least one data bus. Routing may depend on various criteria. For example, supervisory driver may utilize load balancing rules to route the message traffic to a NUMA node 402A or 402B having more available processing and/or transmission capacity. Alone or in conjunction with load-based routing, supervisory driver 400 may employ Application Targeted Routing (ATR) to, for example, protect again a failure of one of NUMA nodes 402A or 402B and/or associated data buses, bus congestion, etc. An example of ATR is disclosed in U.S. published patent application 20090089505 A1 entitled "Steering data units to a consumer" filed Sep. 28, 2007. Determining a return routing for data associated to the message traffic may occur such as described in reference to FIG. 2. The use of supervisory driver 400 may be deemed a fully software-based solution, as opposed to the example set forth in FIG. 2 that may be implemented at least partially utilizing hardware. While a software solution may be easier to implement, there may also be an impact on performance with the solution presented in FIG. 4 due to additional overhead that may be introduced by the additional layer of routing management provided by supervisory driver 400.

Figure 5:
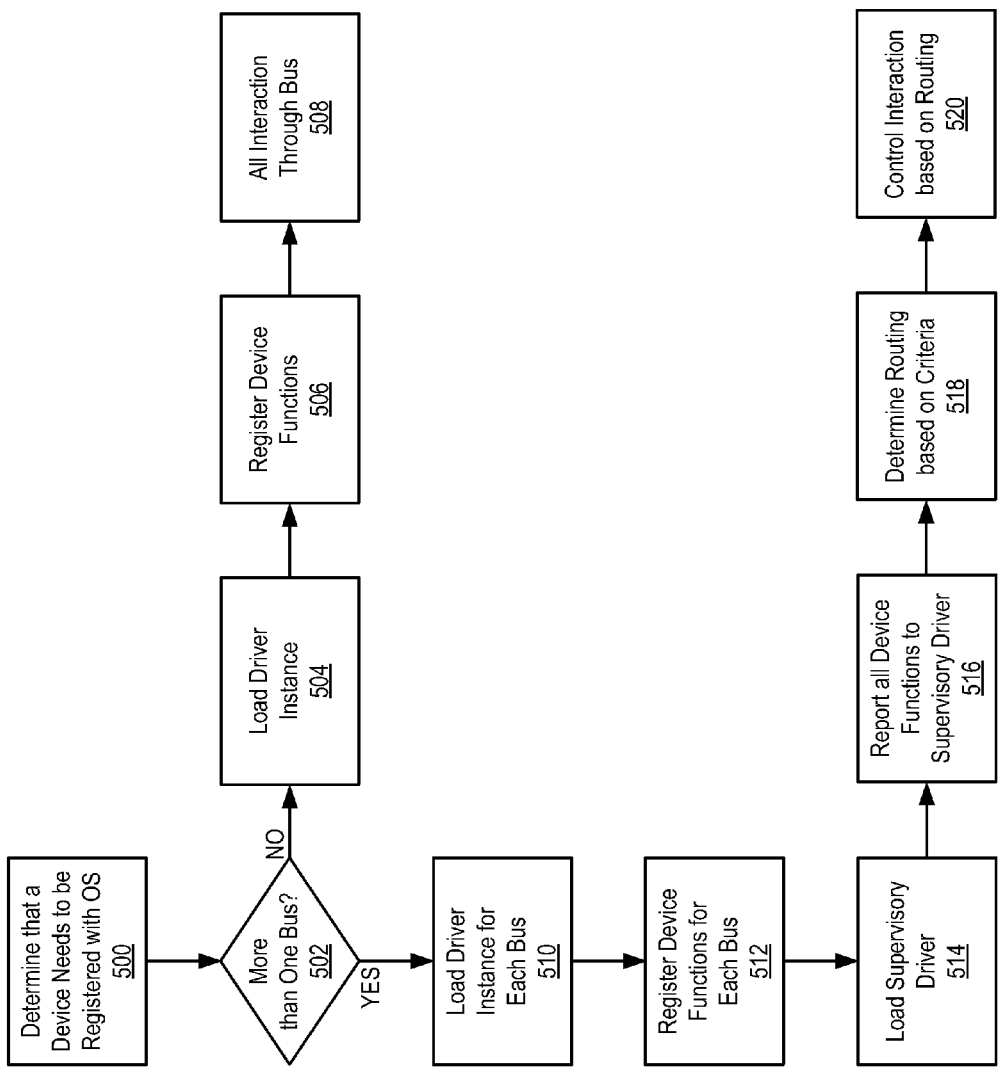
FIG. 5 illustrates example operations for unified device control using a supervisory driver in accordance with at least one embodiment of the present disclosure.

FIG. 5 illustrates example operations for unified device recognition using a supervisory driver in accordance with at least one embodiment of the present disclosure. Operations 500 to 508 may correspond to operations 300 to 308 in FIG. 3 wherein standard device registration may take place if system 100" is determined to only comprise one data bus. If in operation 502 it is determined that system 100" comprises more than one data bus, then in operation 500 a driver instance may be loaded corresponding to each bus (e.g., driver instances 402A and 402B) and each driver instance may register functions locally (e.g., in NUMA nodes 208A and 208B) in operation 512. The registration of functions may include, for example, recording control register addresses to BARs 214A and/or 214B, establishing buffers, queues, interrupts, etc. in memories 212A and 212B of NUMA nodes 208A and 208B, respectively, etc. Supervisory driver 400 may be loaded into system 100" in operation 514, and the functions that were previously registered in operation 512 may be reported to supervisory driver 400 in operations 516. Supervisory driver 400 may then determine routings for interaction between OS 102 and device 104 based on certain criteria in operation 518. Certain criteria may comprise, for example, load-balancing rules, ATR, etc. In operation 520, Supervisory driver 400 may the control interaction between OS 102 and device 104 based on the routing that was determined in operation 518. Controlling interaction may comprise, for example, determining to which data bus message traffic should be directed.

While FIGS. 3 and 5 illustrate operations according to different embodiments, it is to be understood that not all of the operations depicted in FIGS. 3 and 5 are necessary for other embodiments. Indeed, it is fully contemplated herein that in other embodiments of the present disclosure, the operations depicted in FIGS. 3 and 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to a unified device interface for a multi-bus system. In at least one embodiment, a system may comprise more than one data bus. Each data bus may be to convey data between an OS and at least one device in the system, wherein a plurality of driver instances may facilitate interaction between the OS and a device via one or more of the data buses. In one embodiment, a main driver instance may be determined from the plurality of driver instances to present the device to the OS and coordinate operation of other driver instances. The other driver instances may map addresses in the memory of processing entities corresponding to each of the data buses and report these mappings to the main driver instance. Alternatively, a supervisory driver may be loaded to present the device and to control operation of the driver instances.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a multi-bus system including a unified device interface for a multi-bus system.

According to example 1 there is provided a system to coordinate access to a device in the system. The system may comprise a plurality of data buses, at least one device coupled to the plurality of data buses, an operating system and at least one driver to receive configuration data from the at least one device via the plurality of data buses and to coordinate interaction between the operating system and the at least one device based at least on the configuration data.

Example 2 may include the elements of example 1, wherein each of the plurality of data buses is a Peripheral Component Interconnect Express (PCIe) bus comprising at least a PCIe root complex and switch fabric.

Example 3 may include the elements any of examples 1 or 2, wherein the plurality of data buses are each coupled to a plurality of processing entities, each of the plurality of processing entities comprising at least one processor and memory coupled to the at least one processor.

Example 4 may include the elements of 3, wherein the plurality of processing entities are non-uniform memory access (NUMA) nodes.

Example 5 may include the elements of any of examples 3 to 4, wherein the at least one driver comprises a plurality of driver instances, each of the plurality of driver instances being assigned to one of the plurality of processing entities to coordinate interaction between the plurality of processing entities and the operating system.

Example 6 may include the elements of example 5, wherein the at least one driver being to coordinate interaction comprises the at least one driver being to determine a main driver instance in the plurality of driver instances, the main driver instance being at least to register the at least one device with the operating system.

Example 7 may include the elements of example 6, wherein the main driver instance is to receive address mappings from other driver instances in the plurality of driver instances and to assign at least one of queues or interrupts in each processing entity based on the mappings.

Example 8 may include the elements of example 7, wherein the address mappings are Base Address Register (BAR) mappings.

Example 9 may include the elements of any of examples 7 to 8, wherein the plurality of data buses are to convey data between the OS and the at least one device based on the at least one of queues or interrupts in each processing entity.

Example 10 may include the elements of example 9, wherein the plurality of data buses being to convey data between the OS and the at least one device comprises the plurality of data buses being to track from which particular data bus in the plurality of data buses particular data was received, and to route data associated with the particular data back through the particular data bus.

Example 11 may include the elements of any of examples 9 to 10, wherein the plurality of data buses being to convey data between the OS and the at least one device comprises the plurality of data buses being to route data to a particular data bus in the plurality of data buses based on a table indicating memory locations associated with each of the plurality of data buses.

Example 12 may include the elements of any of examples 5 to 11, wherein each of the plurality of driver instances is to establish at least one of queues or interrupts in each assigned processing entity.

Example 13 may include the elements of example 12, further comprising a supervisory driver to control the plurality of driver instances based on certain criteria.

Example 14 may include the elements of example 13, wherein the certain criteria comprises at least load balancing for the plurality of processing entities.

Example 15 may include the elements of any of examples 1 to 14, wherein the plurality of data buses are each coupled to a plurality of processing entities, each of the plurality of processing entities comprising at least one processor and memory coupled to the at least one processor and the at least one driver comprising a plurality of driver instances, each of the plurality of driver instances being assigned to one of the plurality of processing entities to coordinate interaction between the plurality of processing entities and the operating system.

Example 16 may include the elements of example 15, wherein the at least one driver being to coordinate interaction comprises the at least one driver being to determine a main driver instance in the plurality of driver instances, the main driver instance being at least to register the at least one device with the operating system, receive address mappings from other driver instances in the plurality of driver instances and assign at least one of queues or interrupts in each processing entity based on the mappings.

Example 17 may include the elements of any of examples 15 to 16, further comprising a supervisory driver to control the plurality of driver instances based on certain criteria comprising at least load balancing for the plurality of processing entities.

According to example 18 there is provided a method for coordinating access to a device in a system. The method may comprise determining that at least one device needs to be registered with an operating system, the at least one device interacting with the operating system via a plurality of data buses, loading at least one driver to receive configuration data from the at least one device via the plurality of data buses and coordinating the interaction between the operating system and the at least one device based on the configuration data.

Example 19 may include the elements of example 18, wherein each of the plurality of data buses is a Peripheral Component Interconnect Express (PCIe) bus comprising at least a PCIe root complex and switch fabric.

Example 20 may include the elements of any of examples 18 to 19, wherein loading at least one driver comprises loading a plurality of driver instances corresponding to a plurality of processing entities in the system.

Example 21 may include the elements of example 20, wherein the plurality of processing entities are non-uniform memory access (NUMA) nodes.

Example 22 may include the elements of any of examples 20 to 21, an may further comprise determining a main driver instance in the plurality of driver instances, utilizing the main driver instance to register the at least one device with the operating system, receiving address mappings in the main driver instance from other driver instances in the plurality of driver instances, assigning at least one of queues or interrupts in each processing entity based on the mappings and conveying data between the OS and the at least one device based on the at least one of queues or interrupts in each processing entity.

Example 23 may include the elements of example 22, wherein the address mappings are Base Address Register (BAR) mappings.

Example 24 may include the elements of any of examples 22 to 23, wherein conveying data between the OS and the at least one device comprises tracking from which particular data bus in the plurality of data buses particular data was received, and to route data associated with the particular data back through the particular data bus.

Example 25 may include the elements of any of examples 22 to 24, wherein conveying data between the OS and the at least one device comprises routing data to a particular data bus in the plurality of data buses based on a table indicating memory locations associated with each of the plurality of data buses.

Example 26 may include the elements of any of examples 20 to 25, and may further comprise establishing at least one of queues or interrupts in each assigned processing entity utilizing the plurality of driver instances and loading a supervisory driver to control the plurality of driver instances based on certain criteria.

Example 27 may include the elements of example 26, wherein the certain criteria comprises at least load balancing for the plurality of processing entities.

Example 28 may include the elements of any of examples 18 or 27, and may further comprise loading a plurality of driver instances corresponding to a plurality of processing entities in the system, determining a main driver instance in the plurality of driver instances, utilizing the main driver instance to register the at least one device with the operating system, receiving address mappings in the main driver instance from other driver instances in the plurality of driver instances, assigning at least one of queues or interrupts in each processing entity based on the mappings and conveying data between the OS and the at least one device based on the at least one of queues or interrupts in the memory of each processing entity.

Example 29 may include the elements of any of examples 18 or 28, any may further comprise loading a plurality of driver instances corresponding to a plurality of processing entities in the system, establishing at least one of queues or interrupts in each assigned processing entity utilizing the plurality of driver instances and loading a supervisory driver to control the plurality of driver instances based on certain criteria comprising at least load balancing for the plurality of processing entities.

According to example 30 there is provided a system including at least one device, the system being arranged to perform the method of any of the above examples 18 to 29.

According to example 31 there is provided a chipset arranged to perform the method of any of the above examples 18 to 29.

According to example 32 there is provided at least one machine readable medium comprising a plurality of instructions that, in response to be being executed on a computing device, cause the computing device to carry out the method according to any of the above examples 18 to 29.

According to example 33 there is provided a device having a unified device interface for a multi-bus system, the device being arranged to perform the method of any of the above examples 18 to 29.

According to example 34 there is provided a system for coordinating access to a device in a system. The system may comprise means for determining that at least one device needs to be registered with an operating system, the at least one device interacting with the operating system via a plurality of data buses, means for loading at least one driver to receive configuration data from the at least one device via the plurality of data buses and means for coordinating the interaction between the operating system and the at least one device based on the configuration data.

Example 35 may include the elements of example 34, wherein each of the plurality of data buses is a Peripheral Component Interconnect Express (PCIe) bus comprising at least a PCIe root complex and switch fabric.

Example 36 may include the elements of any of examples 34 to 35, wherein the means for loading at least one driver comprise means for loading a plurality of driver instances corresponding to a plurality of processing entities in the system.

Example 37 may include the elements of example 36, wherein the plurality of processing entities are non-uniform memory access (NUMA) nodes.

Example 38 may include the elements of any of examples 36 to 37, and may further comprise means for determining a main driver instance in the plurality of driver instances, means for utilizing the main driver instance to register the at least one device with the operating system, means for receiving address mappings in the main driver instance from other driver instances in the plurality of driver instances, means for assigning at least one of queues or interrupts in each processing entity based on the mappings and means for conveying data between the OS and the at least one device based on the at least one of queues or interrupts in each processing entity.

Example 39 may include the elements of example 38, wherein the address mappings are Base Address Register (BAR) mappings.

Example 40 may include the elements of any of examples 38 to 39, wherein the means for conveying data between the OS and the at least one device comprise means for tracking from which particular data bus in the plurality of data buses particular data was received, and to route data associated with the particular data back through the particular data bus.

Example 41 may include the elements of any of examples 38 to 40, wherein the means for conveying data between the OS and the at least one device comprise means for routing data to a particular data bus in the plurality of data buses based on a table indicating memory locations associated with each of the plurality of data buses.

Example 42 may include the elements of any of examples 36 to 41, and may further comprise means for establishing at least one of queues or interrupts in each assigned processing entity utilizing the plurality of driver instances and means for loading a supervisory driver to control the plurality of driver instances based on certain criteria.

Example 43 may include the elements of example 42, wherein the certain criteria comprises at least load balancing for the plurality of processing entities.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system to coordinate access to a device in the system, comprising:
   a plurality of data buses coupled to a plurality of processing entities, each of the plurality of processing entities comprising at least one processor and memory coupled to the at least one processor;
   at least one device coupled to the plurality of data buses;
   an operating system (OS); and
   at least one driver to receive configuration data from the at least one device via the plurality of data buses and to coordinate interaction between the OS and the at least one device based at least on the configuration data;
   wherein:
   the at least one driver comprises a plurality of driver instances, each of the plurality of driver instances being assigned to one of the plurality of processing entities;
   the at least one driver is to coordinate interaction between the plurality of processing entities and the OS at least in part by determining a main driver instance in the plurality of driver instances, the main driver instance to at least register the at least one device with the OS; and
the main driver instance is to receive address mappings from other driver instances in the plurality of driver instances and to assign at least one of queues or interrupts in each processing entity based on the mappings.

2. The system of claim 1, wherein the plurality of data buses are to convey data between the OS and the at least one device based on the at least one of queues or interrupts in each processing entity.

3. The system of claim 2, wherein the plurality of data buses being to convey data between the OS and the at least one device comprises the plurality of data buses being to track from which particular data bus in the plurality of data buses particular data was received, and to route data associated with the particular data back through the particular data bus.

4. The system of claim 2, wherein the plurality of data buses being to convey data between the OS and the at least one device comprises the plurality of data buses being to route data to a particular data bus in the plurality of data buses based on a table indicating memory locations associated with each of the plurality of data buses.

5. The system of claim 1, wherein each of the plurality of driver instances is to establish at least one of queues or interrupts in each assigned processing entity.

6. The system of claim 5, further comprising a supervisory driver to control the plurality of driver instances based on certain criteria.

7. The system of claim 6, wherein the certain criteria comprises at least load balancing for the plurality of processing entities.

8. A method for coordinating access to a device in a system, comprising:
determining that at least one device needs to be registered with an operating system (OS), the at least one device interacting with the OS via a plurality of data buses;
loading at least one driver to receive configuration data from the at least one device via the plurality of data buses at least in part by loading a plurality of driver instances corresponding to a plurality of processing entities in the system;
coordinating the interaction between the OS and the at least one device based on the configuration data;
determining a main driver instance in the plurality of driver instances;
utilizing the main driver instance to register the at least one device with the OS;
receiving address mappings in the main driver instance from other driver instances in the plurality of driver instances; and
assigning at least one of queues or interrupts in each processing entity based on the mappings.

9. The method of claim 8, further comprising:
conveying data between the OS and the at least one device based on the at least one of queues or interrupts in each processing entity.

10. The method of claim 9, wherein conveying data between the OS and the at least one device comprises tracking from which particular data bus in the plurality of data buses particular data was received, and to route data associated with the particular data back through the particular data bus.

11. The method of claim 9, wherein conveying data between the OS and the at least one device comprises routing data to a particular data bus in the plurality of data buses based on a table indicating memory locations associated with each of the plurality of data buses.

12. The method of claim 8, further comprising:
establishing at least one of queues or interrupts in each assigned processing entity utilizing the plurality of driver instances; and
loading a supervisory driver to control the plurality of driver instances based on certain criteria.

13. The method of claim 12, wherein the certain criteria comprises at least load balancing for the plurality of processing entities.

14. At least one non-transitory machine-readable storage medium having stored thereon, individually or in combination, instructions for coordinating access to a device in a system that, when executed by one or more processors, cause the one or more processors to:
determine that at least one device needs to be registered with an operating system (OS), the at least one device interacting with the OS via a plurality of data buses;
load at least one driver to receive configuration data from the at least one device via the plurality of data buses at least in part by loading a plurality of driver instances corresponding to a plurality of processing entities in the system; and
coordinate the interaction between the OS and the at least one device based on the configuration data;
determine a main driver instance in the plurality of driver instances;
utilize the main driver instance to register the at least one device with the OS;
receive address mappings in the main driver instance from other driver instances in the plurality of driver instances; and
assign at least one of queues or interrupts in each processing entity based on the mappings.

15. The medium of claim 14, further comprising instructions that, when executed by one or more processors, cause the one or more processors to:
convey data between the OS and the at least one device based on the at least one of queues or interrupts in each processing entity.

16. The medium of claim 15, wherein the instructions to convey data between the OS and the at least one device comprise instructions to track from which particular data bus in the plurality of data buses particular data was received, and to route data associated with the particular data back through the particular data bus.

17. The medium of claim 15, wherein the instructions to convey data between the OS and the at least one device comprise instructions to route data to a particular data bus in the plurality of data buses based on a table indicating memory locations associated with each of the plurality of data buses.

18. The medium of claim 14, further comprising instructions that, when executed by one or more processors, cause the one or more processors to:
establish at least one of queues or interrupts in each assigned processing entity utilizing the plurality of driver instances; and
load a supervisory driver to control the plurality of driver instances based on certain criteria.

19. The medium of claim 18, wherein the certain criteria comprises at least load balancing for the plurality of processing entities.

* * * * *